FRANCIS H. SMITH.

Improvement in Drying Fruits, Vegetables, &c.

No. 4,834. Reissued March 26, 1872.

Witnesses:

E. Marshall Smith

Chas W. Kirkman

Inventor:

Fr H Smith

UNITED STATES PATENT OFFICE.

FRANCIS H. SMITH, OF BALTIMORE, MARYLAND, ASSIGNOR, BY MESNE ASSIGNMENTS, TO MARSHALL P. SMITH, OF SAME PLACE.

IMPROVEMENT IN DRYING FRUITS, VEGETABLES, &c.

Specification forming part of Letters Patent No. 31,566, dated February 26, 1861; reissue No. 3,017, dated June 30, 1868; reissue No. 4,468, dated July 11, 1871; reissue No. 4,831, dated March 26, 1872.

*To all whom it may concern:*

Be it known that I, FRANCIS H. SMITH, of the city and county of Baltimore and State of Maryland, have invented a new and useful Improvement in Drying Tunnels or Chambers for Drying Fruit, Vegetables, &c.; and I do hereby declare that the following is a full, clear, and exact description of the same, reference being had to the accompanying drawing forming a part of this specification, in which—

Figure 1:
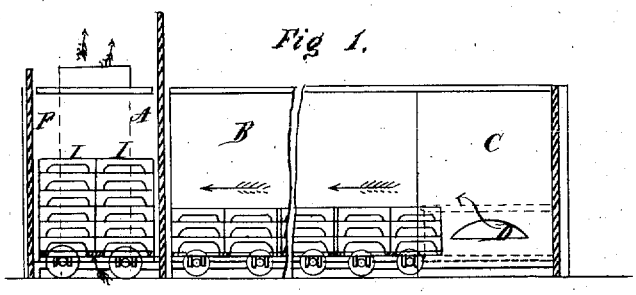
Figure 3:
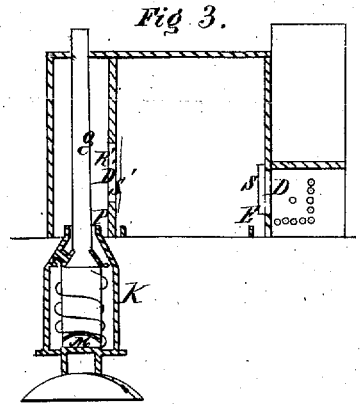
Figure 2:
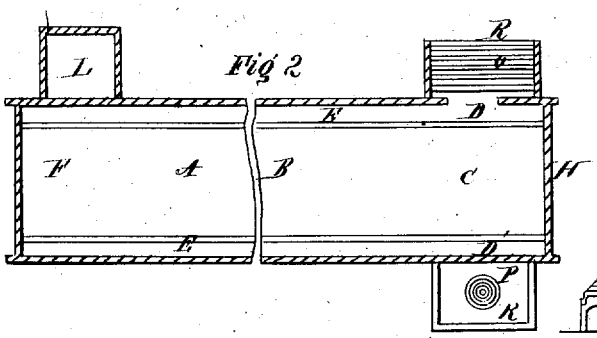
Figure 4:
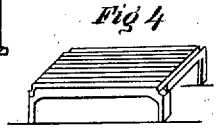
Figure 9:
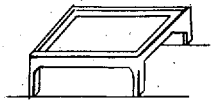
Figure 5:
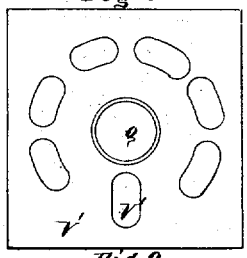
Figure 7:
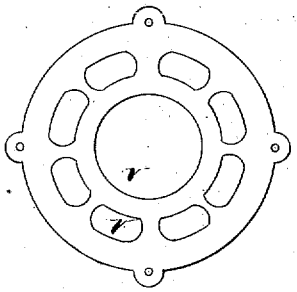
Figure 6:
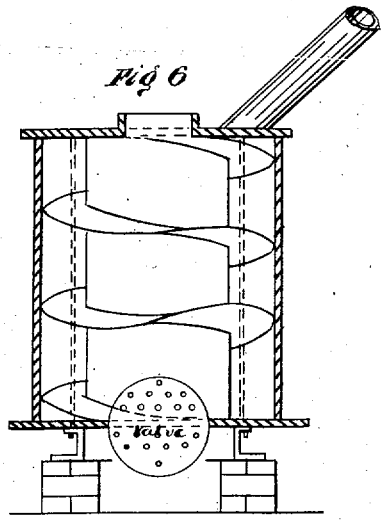
Figure 8:
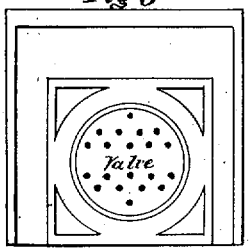

Figure 1 represents a longitudinal vertical, Fig. 2 a horizontal, Fig. 3 a vertical cross-section of my drying-tunnel. Fig. 4 is a perspective view of one of the trays, hereinafter described. Fig. 5 is a perspective view of a car with its complement of trays.

Similar letters of reference in each of the several figures indicate corresponding parts.

The nature of my invention consists in a tunnel or drying chamber, having a furnace or its equivalent at the rear end and a chimney at the front end, where the articles to be dried are first entered, in combination with gates, cars, trays, and inclined rails, or their equivalents, constructed substantially as and for the purposes hereinafter described.

My apparatus has been constructed with two separate furnaces to answer a two-fold purpose—one to dry bricks and other like substances by directing the products of combustion from the furnace directly into the tunnel or chamber and causing them to traverse its length to the exit or chimney; the other, for drying fruits, vegetables, meats, &c., by a current of warm air heated by a furnace and made to traverse the chamber, as before. It is very manifest, however, that these two operations may be separated and a chamber with a single furnace constructed and adapted to either of the purposes mentioned.

The operations of my drying-chamber are intended to go on continuously; the articles are moved onward as the drying progresses; fresh ones are entered at the end where the warm air escapes and those dried are taken out where the warm air first enters, and thus the chamber at the same time is filled with articles in all the different stages of dryness.

As the warm air traverses the drying-chamber and encounters the fruits and vegetables, on which it acts, its temperature will be gradually lowered by the evaporation of the moisture which it absorbs; in like manner, as in its progress, it becomes more and more charged with moisture its drying capability will be gradually diminished from its entrance to its exit. In their progress through the chamber the articles are thus subjected to an increasing temperature and to air of increasing dryness. It hence results that the drying operation is slow at first, gradually increases with the progress of the articles through the chamber, and has its highest intensity at the end where they are removed.

Recapitulating, then, the more prominent features of my process for drying fruits and vegetables, they are: first, air artificially warmed; second, a current coming in contact with the articles to be dried; third, an increasing temperature; fourth, increasing dryness; and fifth, a continuous operation.

This combination has produced a result that, so far as I am informed, has never before been obtained.

If fruits and vegetables when fresh are subjected to a drying process too rapid a thin crust or layer of dried material will be formed on the outside that impedes the escape of moisture from within; on the other hand, if a rate of drying proper for the commencement be continued, fermentation and partial decomposition will set in, with great injury to the flavor and quality. The heat at first must be allowed to permeate the whole mass before much drying takes place; after that the operation may be made more and more rapid to the end. In this way I have in a few hours perfectly dried both fruits and vegetables with little or no change of flavor or sweetness, and very important results have followed.

To enable others to construct my apparatus, I proceed to a more extended description.

A B C represents a tunnel of considerable length, (say three hundred feet,) made of brick-work or other suitable material. The rear and front ends of the tunnel are provided with gates H F, which can be closed or opened, as may be necessary, in the course of the operation. The front portion A of the tunnel may be cut off from the main part of the tunnel by means of a gate, G, which is represented half open in Fig. 1. The section A communicates with a chimney, L, while the rear end C of the tunnel communicates, through an opening, D, with a furnace provided with a suitable grate, O. A railway is laid on the floor of the tunnel, the rails E E being somewhat inclined from the front toward the rear of the tunnel. A number of cars—enough to fill the whole length of the tunnel—are provided, and are to be loaded one after the other with trays I, upon which the articles to be dried are placed. The said trays are constructed as clearly shown in Fig. 4, having each four legs, *i*, fitting in cavities *i'*, in the upper corners of the tray below. This construction is needful in order to enable the trays to stand securely in four separate stacks, as represented in Fig. 5, with a space between their edges to facilitate handling.

The first car having been freighted in this manner, while in section A of the tunnel, the gate F is shut and the gate G is opened, as seen in Fig. 1, and the car is pushed into the main part B of the tunnel so that the gate G can be shut behind it. The gate F is then opened and the next car is entered into section A, and, after having been freighted in the same manner as the preceding car, the gate G is again opened and the car is moved forward into section B, pushing the first car forward. The gate G is then again shut, gate F is opened, and the third car is entered and freighted, and so forth, each car pushing forward the preceding series of cars as it enters the main part B of the tunnel, until the car which had been entered first arrives at the end C of the tunnel. The gate H is then opened as often as a car is entered in order to allow the last car of the series to pass out of the tunnel.

The heated gases arising from the combustion of fuel in furnace R enter through opening D and pass through the whole length of the tunnel, and finally out at the chimney L. From this it will be seen that the substances to be dried enter the tunnel at the end where the temperature is lowest, and are gradually subjected to an increasing heat as they approach the other end of the tunnel, where they finally come in contact with the intense heat arising directly from the furnace.

It is intended that about twenty-four hours shall elapse from the entrance to the exit of each particular car, thereby giving ample time for drying the articles with which the cars are freighted thoroughly while they pass through the entire length of the tunnel.

The rails E E are inclined, as shown in Fig. 1, so that the whole series of cars can be pushed along easily by the operator or operators attending the rear car.

The draught caused from the furnace R through the whole length of the tunnel, toward and out of the chimney L, serves to carry the moisture of the drying articles away as fast as it is liberated, by which means the drying process is considerably facilitated.

Fig. 3 represents, at Q R' D' S' P N M K, a modification—a substitute for the furnace R, to suit the apparatus for drying fruit, vegetables, and similar articles. For this purpose the opening D, connecting the tunnel with the furnace R, is closed by means of a suitable valve or damper, S, and the valve or damper S' is opened so as to effect communication between the rear part of the tunnel and a hot-air chamber, R', through opening D'. The air in this chamber is heated by means of a suitable hot-air furnace, which consists of a drum, K, spiral hot-air passage N, central fire-place M, and smoke-stack Q.

The hot air passes from the drum through P into chamber R', and hence through opening D' into the tunnel, obeying the draught created by the chimney L at the front end, and thereby drying the articles upon the shelves and cars passing through the tunnel, in the same manner as already set forth.

The horizontal position of the tunnel or chamber saves the necessity of elevating the articles in order to pass them through it, and it is particularly advantageous for drying brick and other heavy articles; and, what is of much more importance, there is no tendency in that position of air warmer than the rest rushing to one end rather than the other. It consequently passes through the chamber no faster than fresh air is supplied from the furnace, and the varying heat of the chamber is thus maintained. Were the tube inclined or perpendicular the warmer air, on account of its lightness, would at once rise to the top, and the main features of my process—that of progressive heat and dryness—would be destroyed or, perhaps, reversed. In drying fruits and vegetables the horizontal position seems, therefore, to be indispensable, unless some means be adopted that shall prevent the warmer air from rising to the top without passing through the articles to be dried.

I am aware that in burning brick and pottery, in roasting ores and smelting metals, a progressive heat is desirable and has been used. This, of course, I do not claim; nor indeed any chamber for drying fruits and vegetables that forms a part of the furnace or its chimney, or into which the fires or products of combustion enter; but What I do claim, in the drying of fruits and vegetables, and desire to secure by Letters Patent, is—

1. A chamber, through which a current of air is passed, and in which the articles to be dried are subjected to a progressive temperature and dryness, substantially as described.

2. I claim the process of drying fruits and vegetables by subjecting them to a current of air artificially warmed, in combination with a gradually-increasing temperature and increasing dryness, substantially as described.

3. I claim a drying-chamber in which the operation is continuous, in combination with increasing temperature and dryness, as above set forth.

4. I claim a drying-chamber in which the drying air is admitted at one end and escapes at the other, when such air passes through and around the articles to be dried so as gradually to reduce its temperature and dryness, as described.

FRS. H. SMITH.

Witnesses:
MARSHALL P. SMITH,
JAS. W. KIRKMAN.